United States Patent [19]

Greenslade

[11] Patent Number: 5,117,561
[45] Date of Patent: Jun. 2, 1992

[54] ROTATABLE GAUGING PLATE FOR A FASTENER DIMENSION MEASURING MACHINE

[76] Inventor: Joe E. Greenslade, P.O. Box 330865, Fort Worth, Tex. 76163

[21] Appl. No.: 636,688

[22] Filed: Jan. 2, 1991

Related U.S. Application Data

[60] Division of Ser. No. 544,311, Jun. 27, 1990, Pat. No. 5,012,592, which is a continuation-in-part of Ser. No. 313,909, Feb. 23, 1990, abandoned.

[51] Int. Cl.$^5$ .............. B23Q 16/00; G01B 3/00; G01B 5/00
[52] U.S. Cl. .............. 33/573; 33/833; 33/569; 33/549; 33/555.2
[58] Field of Search .............. 33/555.2, 568, 569, 33/549, 832, 833, 548

[56] References Cited

U.S. PATENT DOCUMENTS

| | | | |
|---|---|---|---|
| 145,500 | 12/1873 | Hardie | 33/555.2 |
| 437,796 | 10/1890 | Preston | 33/555.2 |
| 861,443 | 7/1907 | Eckard | 33/555.2 |
| 907,735 | 12/1908 | Cain, Jr. | 33/555.2 |
| 1,007,185 | 10/1911 | Craley | 33/568 |
| 1,554,143 | 9/1925 | Tyvand | 33/555.42 |
| 1,881,651 | 6/1930 | Judge | 33/555.2 |
| 1,989,353 | 1/1935 | Davis | 33/555.2 |
| 2,413,566 | 12/1946 | Hohwart et al. | 33/555.2 |
| 2,728,145 | 12/1955 | Holladay | 33/555.2 |
| 2,811,781 | 11/1957 | Johnson et al. | 33/569 |
| 2,896,333 | 7/1959 | Kivela | 33/555.2 |
| 3,239,939 | 3/1966 | Aller | 33/549 |
| 3,315,365 | 4/1967 | Aldeborgh | 33/573 |
| 3,793,738 | 2/1974 | Blakey | 33/573 |
| 3,823,482 | 7/1974 | Schiler | 33/549 |
| 3,895,356 | 7/1975 | Kraus | 33/832 |
| 3,939,569 | 2/1976 | Squires | 33/832 |
| 4,106,240 | 8/1978 | DeBartolo | 33/832 |
| 4,107,850 | 8/1978 | Adler | 33/555.2 |
| 4,565,094 | 1/1986 | Sedgewick | 33/5.68 |
| 4,598,480 | 7/1986 | Cukelj | 33/833 |
| 4,679,326 | 7/1987 | Takizawa et al. | 33/832 |
| 4,805,310 | 2/1989 | Fernand | 33/832 |
| 4,825,577 | 5/1989 | Nettleton et al. | 33/549 |

FOREIGN PATENT DOCUMENTS

| | | | |
|---|---|---|---|
| 66194 | 1/1948 | Fed. Rep. of Germany | 33/569 |
| 1912605 | 10/1970 | Fed. Rep. of Germany | 33/832 |
| 58-47202 | 3/1983 | Japan | 33/832 |
| 60-107509 | 6/1985 | Japan | 33/832 |

OTHER PUBLICATIONS

"Dimension-All, Fastener Gage," Fastener Inspection Products, Fort Worth, Tex. (No date).

Primary Examiner—William A. Cuchlinski, Jr.
Assistant Examiner—Diego F. F. Gutierrez
Attorney, Agent, or Firm—Henry W. Cummings

[57] ABSTRACT

A gauging plate for measuring fastener dimensions includes a rotatable plate having a plurality of openings for measuring fastener dimensions. The plate is rotatable to permit alignment of openings with a measuring member to enable the measurement of dimensions of a wide variety of fasteners. The plate preferably includes at least one slot in the periphery to receive fasteners to have dimensions measured. In the plate at least some of the openings extend throughout the thickness of the plate. The plate includes rotational means to rotate the plate to a plurality of dimension measuring positions. At least one adjusting screw is provided extending through the plate. The adjusting screw is adjustable to selected distances above the plate to enable adjustments of tolerance limits of the dimensions to be measured.

3 Claims, 5 Drawing Sheets

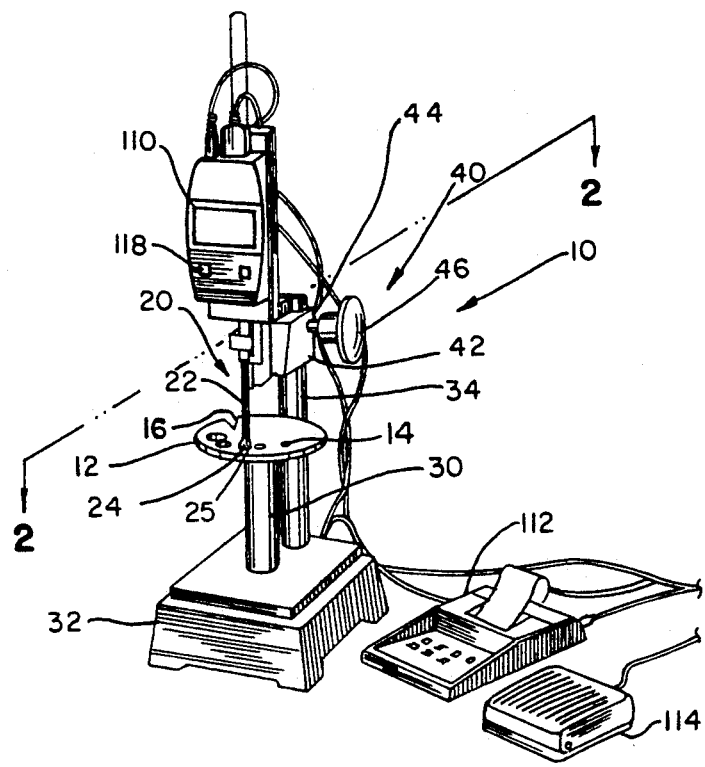
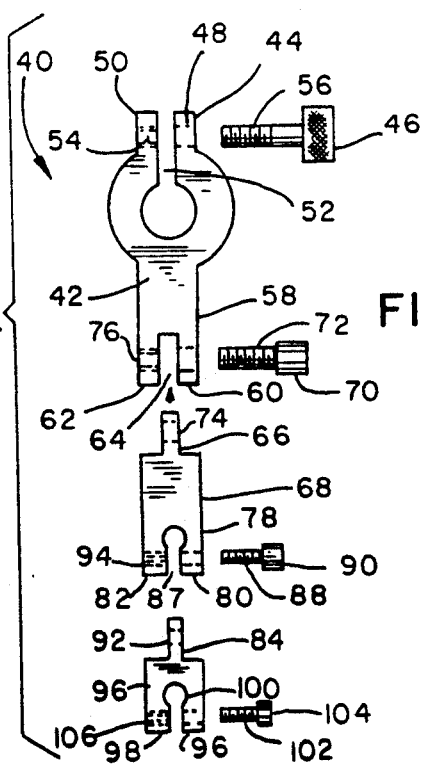
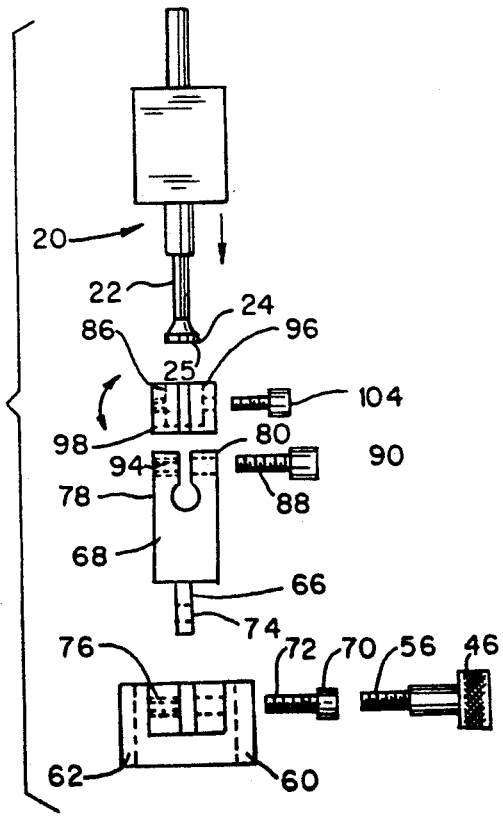
FIG. 1.
FIG. 2.
FIG. 3.

ROTATABLE GAUGING PLATE FOR A FASTENER DIMENSION MEASURING MACHINE

REFERENCE TO RELATED APPLICATION

This is a division of application Ser. No. 07/544,311, filed Jun. 27, 1990, now U.S. Pat. No. 5,012,592, which is a continuation in part of application Ser. No. 07/313,909, filed Feb. 23, 1990, now abandoned.

BACKGROUND OF THE INVENTION

Previous fastener dimension measuring machines have not had the ability to quickly and accurately measure fastener dimensions.

Another important objective is the ability to record selected data, and print out the data quickly.

Another object of the invention is to be able to quickly provide adjustment of the dimension measuring member.

Other objects will be apparent from the following description and drawings.

SUMMARY OF THE INVENTION

A gauging plate for measuring fastener dimensions includes a rotatable plate having a plurality of openings for measuring fastener dimensions. The plate is rotatable to permit alignment of openings with a measuring member to enable the measurement of dimensions of a wide variety of fasteners. The plate preferably includes at least one slot in the periphery to receive fasteners to have dimensions measured. In the plate at least some of the openings extend throughout the thickness of the plate. The plate includes rotational means to rotate the plate to a plurality of dimension measuring positions. At least one adjusting screw is provided extending through the plate. The adjusting screw is adjustable to selected distances above the plate to enable adjustments of tolerance limits of the dimensions to be measured.

BRIEF DESCRIPTION OF THE DRAWINGS

FIG. 1 is a schematic perspective view of the Fastener Dimension Measuring Machine of the present invention.

FIG. 2 is an exploded plan view of the measuring member adjustment assembly looking in the direction of the arrows in FIG. 1.

FIG. 3 is an exploded front view of the adjustment assembly illustrated in FIG. 2.

DESCRIPTION OF PREFERRED EMBODIMENTS

Figure 7:
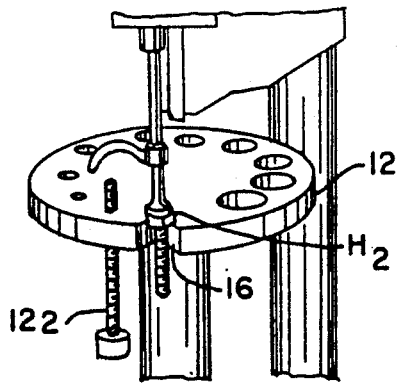
FIG. 7 is a schematic perspective view of the fastener dimension measuring machine of the invention including a slot in the rotatable plate to measure fastener heads.
Figure 10:
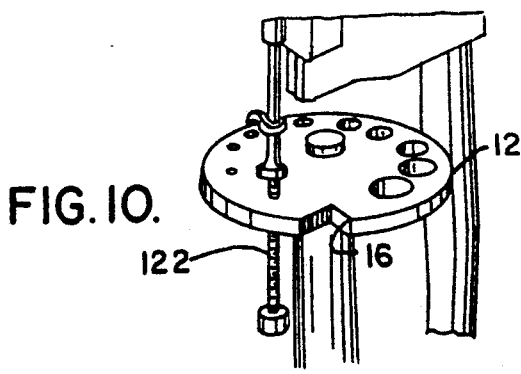
FIG. 10 is a schematic perspective view illustrating the adjustment screw used to set the product measurement limits in the digital controller.

In the drawings, the fastener dimension measuring machine is indicated at 10. This machine includes a rotatable plate 12 containing a series of openings 14 extending through the thickness of the plate, of varying diameters, to receive fasteners to have their dimensions measured. The plate 12 is suffeciently thick to allow measurements of the heads of fasteners whose shanks extend through the plate. A diameter of 4 to 6 inches and a thickness of 0.20 to 0.40 inches is convenient. As shown in FIG. 7 plate 12 also includes a slot 16 in its external surface to receive fasteners for measuring dimensions.

A measuring member 20 is located above the plate which is vertically movable between a measuring position engaging the surface of a fastener to be measured, and a placement position above the plate when fasteners are inserted or removed from the plate. The measuring member includes a shank portion 22, and a measuring foot 24. The foot is of preferably of greater cross sectional area than the shank portion, and includes a flat lower measuring surface 25.

Plate 12 is rotatable about, and is supported by a pedestal 30, which, in turn rests upon a base 32. Base 32 also supports a vertical support shaft 34 upon which is mounted a measuring member adjusting assembly 40 shown in FIGS. 2 and 3.

Adjusting assembly 40 includes an indicator support 42 having an adjustment portion 44 which engages support shaft 34, and whose location on the shaft 34 is controlled by knob 46. Upon loosening knob 46, indicator support arm 42 may raised or lowered with respect to support shaft 34, or may be rotated to a different angular position upon shaft 34.

Figure 4:
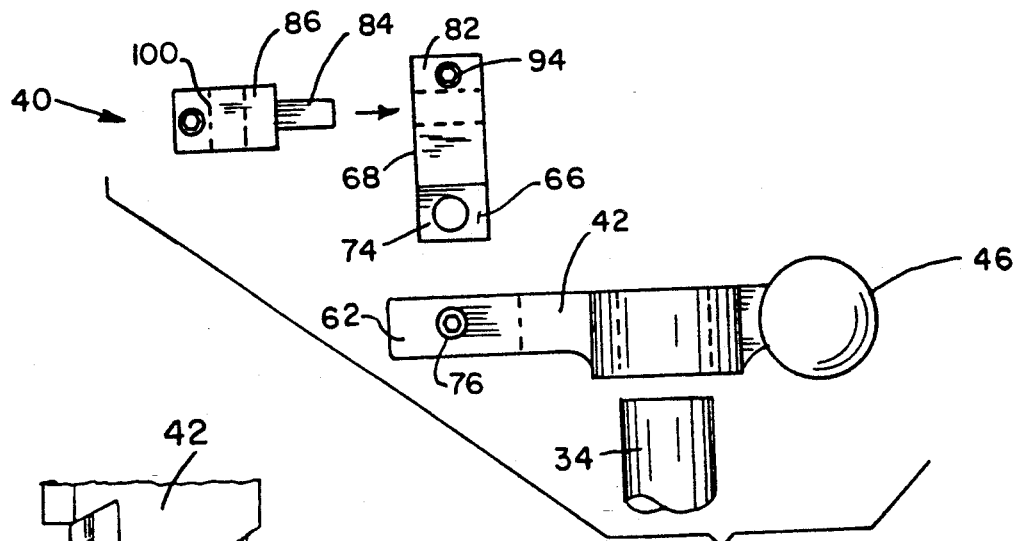
FIG. 4 is an exploded side elevation view of the adjustment assembly illustrated in FIG. 2.

The details of the support assembly 40 are shown in FIGS. 2-4. As shown in FIG. 2, the support arm 42 includes a bifurcated adjustment portion 44 having legs 48 and 50. Leg 48 includes an opening 52, and leg 50 includes a threaded opening 54 which receives threaded shank 56 of adjusting knob 46. Thus arm 42 may be adjusted vertically and radially upon shaft 34 by loosening and then tightening knob 46.

The distal end 58 of arm 42 is bifurcated and includes legs 60 and 62. A slot 64 between legs 60 and 62 receives an extension 66 of middle knuckel 68. Extension 66 may be located at a desired angularity within slot 64, and is held in place by tightening control screw 70, with threaded shank 72 extending through opening 74 in extension 66, and engaging threaded opening 76 to provide vertical and lateral adjustability.

Middle knuckle 68 is also bifurcated at its distal end and includes two legs 80 and 82. An extension 84 of front knuckle 86 extends into opening 87 and is adjustable therein by shank 88 of adjusting screw 90 extending through opening 92 of extension 84 into threaded opening 94 in leg 82, to provide horizontal adjustability.

Front knuckle 86 is also bifurcated at its distal end and includes legs 96 and 98, and opening 100. Opening 100 receives connection portion 26 of measuring member 20. Connection portion 26 is held in place within front knuckle 86 by the shank 102 of adjusting screw 104 extending into threaded opening 106 in leg 98.

The digital process controller 112 is a commercially available data processing unit. For example a MITU-TOYO DIGIMATIC MINI-PROCESSOR, Model No. DP-1DX 264-501 may be used for processing the dimensional data obtained in accordance with the present invention. The OPERATING MANUAL for this unit is hereby incorporated into the present application by this reference. A copy is found in the file of this application.

As described in greater detail in this OPERATING MANUAL, this processor includes a rear panel 122A including a jack 123 to receive electrical signals for the foot switch 114. A mode switch 124 is also provided on digital process controller 112. Connection jacks 125 to receive electrical signals from the measuring unit 20 and the indicator 110, and an alternating current adaptor 127 are also provided.

A control panel 129 is provided to control operation of processing the dimension data. This control panel includes a clear key 132 to clear all the data in memory; a cancel key 134 to cancel a data entered immediately before pressing this key; a tolerance limit key 126 to be pressed before and after entering tolerance limit values; a statistical key 130, to begin processing statistical calculations and plotting data; a feed key 136 to feed recording paper; and ad data key 128 to enter measurementsor limits displayed on the indicator 110 into the digital processor 112. Detailed operating instructions are contained in the OPERATING MANUAL found in the application file, and will not be repeated here.

Figure 11:
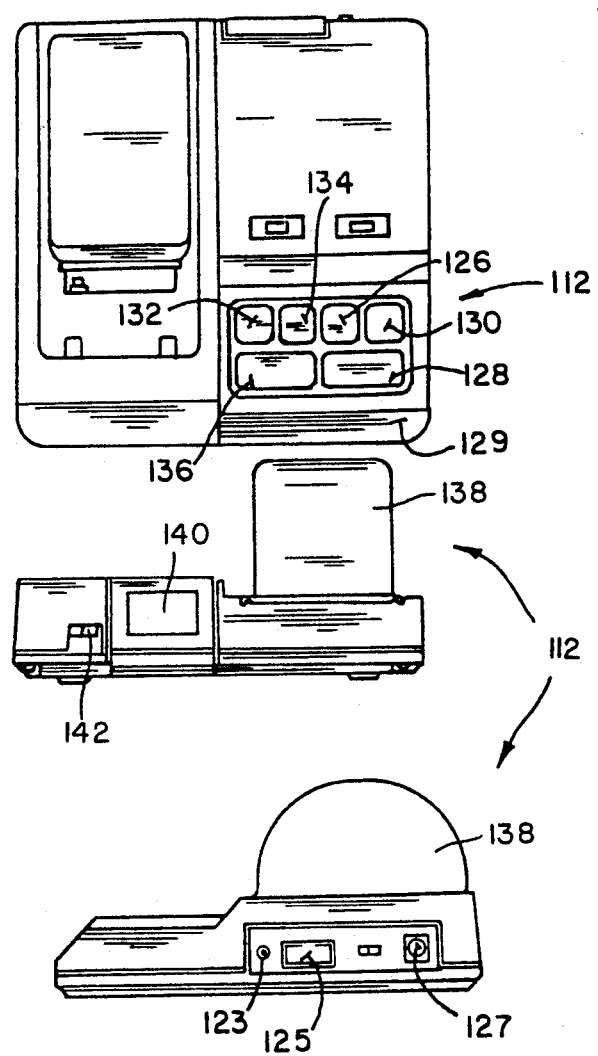
FIG. 11 is a schematic plan view of the digital process controller used in the present invention.
Figure 12:
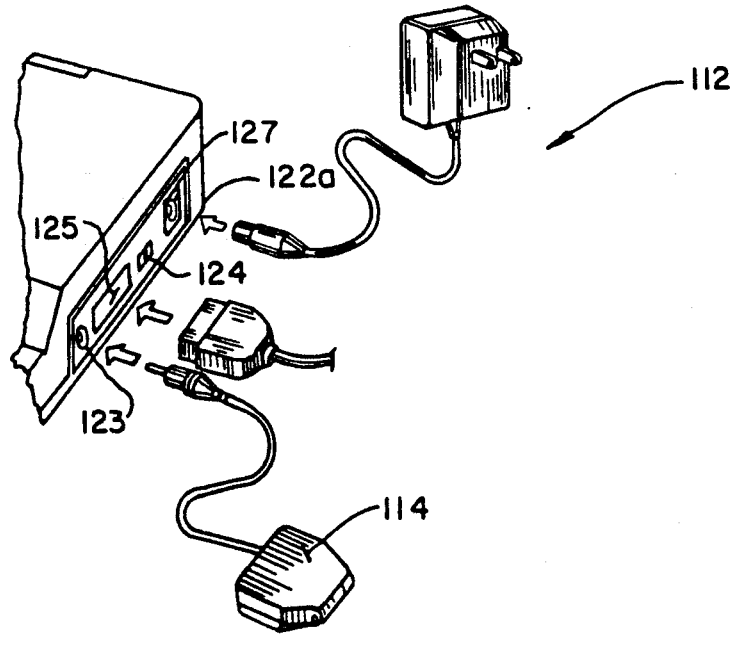
FIG. 12 is a schematic perspective view of a portion of the digital process controller used in the present invention.

The processor 112 does include, as shown in FIG. 11, a recording paper cover 138, a battery box 140 in case A.C. current is not used, and a power on and off switch 142.

It therefore is apparent that measuring member 20 may be located in any appropriate position above plate 12 to effect measurements of a fastener.

The fastener dimensions being measured are readable on an electronic digital indicator providing by Mitutoyo of Japan Model #543-425. This may be obtained, for example, from Fastener Inspection Products in Rockford, Ill. and indicated at 110 in the drawing.

Fastener data may be recorded and processed through a purchased data processor, for example, from Mitutoyo of Japan, Model #264-501 indicated at 112 in the drawings.

To activate recording of the data, a foot switch 114 is provided which is an electrical contact with the indicator 110. The foot switch is also obtainable from Mitutoyo of Japan for example Model #937-179 which can also be obtained from Fastener Inspection Products in Rockford, Ill.

Figure 5A:
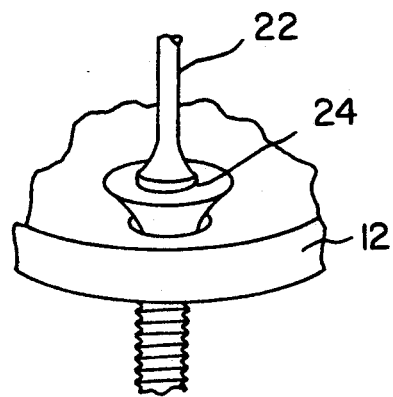
FIG. 5a is an enlarged perspective view of a portion of FIG. 5.
Figure 5:
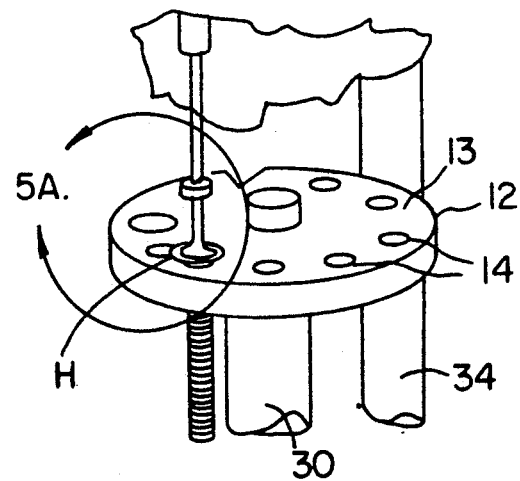
FIG. 5 is a schematic perspective view of measuring flat head fasteners in accordance with the present invention.

In use of the present invention to measure the protrusions on flathead fasteners as shown in FIGS. 5 and 5A, the indicator foot lower surface 25 is placed on the upper surface 13 of the plate 12. The zero button 118 of the apparatus is then pressed. The flathead fastener is then placed in the correct hole size marked on the plate 12 in which the fastener head is larger than the diameter of the opening. The measuring member is moved until the foot rests on the top of the head H to be measured. The measurement is displayed at 110. The data may be recorded with foot switch 114. Protrusion gaging of counter sunk heads can also be measured according to attached ANSI B18.6.2-6.4 Standard, and values of F and F' calculated, as shown in FIG. 5A.

Figure 6:
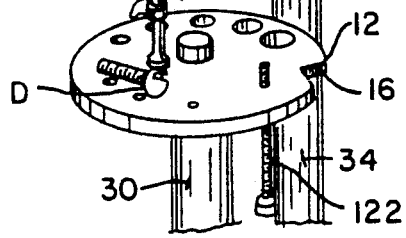
FIG. 6 is a schematic perspective view of measuring diameters of fasteners in accordance with the present invention.

As shown in the FIG. 6, to measure the outside diameters and other measurements, first, the lower surface of the indicator foot 25 is placed on the upper surface 13 of the plate 12 in a blank area and the zero button 118 is pressed. Then the indicator foot 24 is lifted and the fastener or other dimension desired to be measured is placed under the indicator foot. The lower surface 25 of the indicator foot is then located on the surface of the fastener or other member to be measured and the diameter D, or other results read from the indicator 110. If it is desired to record the data at the time of the measurement, the foot switch 114 is pressed.

As shown in FIG. 7, to measure the head height of fasteners, first the knob 46 is loosened on the indicator support arm 34 and the arms are rotated to either side so that the indicator foot 24 is over the edge of the plate 12. The rod 46 is then retightened.

Zero button 118 is pressed. The plate is then rotated so that the slot 16 in the outer surface of the plate is under the indicator foot 24. Then the foot 24 is lifted and parts placed into the slot 16 to measure the height. If it is desired to record data, foot switch 114 is pressed.

Figure 9:
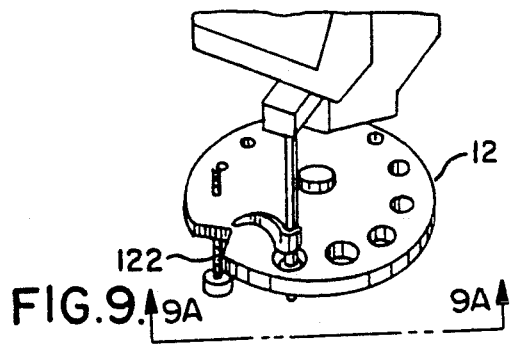
FIG. 9 is a schematic perspective view of another step in measuring the length of fasteners in accordance with the invention.
Figure 8:
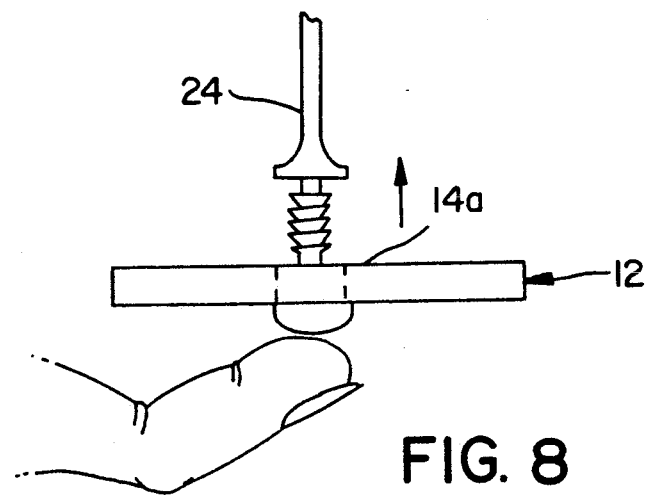
FIG. 8 is a side elevation view of measuring lengths of fasteners in accordance with the present invention.
Figure 9A:
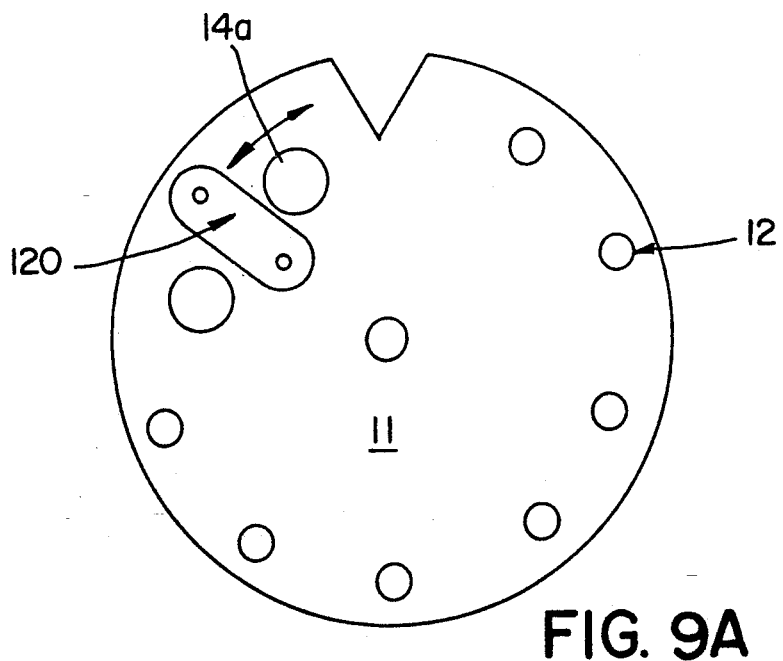
FIG. 9a is a bottom view looking in the direction of the arrows along the line 9a in FIG. 9.

In FIGS. 8, 9, and 9A, for measurement of lengths from ¼" to 2", first the stop 120 is set under the hole 14a marked ⅜" in the plate 12 in such a manner that the stop is across the bottom of the hole as shown in FIG. 9A, and firmly against the bottom 11 of the plate. Next the plate is rotated until the indicator foot drops into the ⅜" hole 14a and rests firmly against the stop. Then zero button 118 is pressed, and the foot 24 is lifted and the plate 12 is rotated so that the foot 24 is above a hole slightly larger than the major diameter of the part. Then, as shown in FIG. 8, the part to be measured is inserted from the lower surface 11 of the plate 12, pressing the underside of the head firmly against the bottom of the plate 12 to measure the parts length. If it is desired to record the data, press the foot switch 114.

It is possible to change the characteristics tolerances in the process. In order to do this, first the indicator is zeroed as described above for the characteristic of the fastener desired to be measured. Next, the plate 12 is moved so that the indicator foot 24 is located over the adjustment screw 122 which extends through the plate. Next the mode switch 124 is set to mode 2. Then the button 126 on the processor labeled "tolerance limit" is pressed. Then the adjusting screw 122 is moved up or down till the indicator reads the lower limit of the tolerance of the part you will inspect and press "data" at switch 128. Next move the adjustment screw 122 up until the indicator reads to the upper limit of the tolerance of the part you will inspect and press data button 128 again. Next, tolerance limit is again pressed. Then move the plate 12 so that it positioned to measure the desired characteristic correctly. Then, measure the parts, pressing the foot switch 114 when the part is in proper position. After measuring all samples press button 130. To remove the tolerance limits you set into the processor, press tolerance limits 126. Then press clear button 132.

I claim:

1. A gauging plate for measuring fastener dimensions comprising: a rotatable plate having a plurality of openings therein for measuring fastener dimensions; said plate being rotatable to permit alignment of said openings with a measuring member to enable the measurement of the dimensions of a wide variety of fasteners; said gauging plate, including at least one adjusting screw extending through said plate and being adjustable to selected distances at least above said plate to enable adjustment of tolerance limits of dimensions to be measured.

2. A gaging plate according to claim 1 wherein said plate includes at least one slot in the perifery thereof to receive fasteners and other members to have dimensions measured.

3. A gaging plate according to claim 1 wherein said plate is generally circular, at least some of said opening extend throughout the thickness of said plate, and wherein said plate includes means for receiving rotational force to rotate said plate to a plurality of dimension measuring positions.

* * * * *